United States Patent
Eggert et al.

(10) Patent No.: US 10,268,553 B2
(45) Date of Patent: Apr. 23, 2019

(54) ADAPTIVE FAILURE PREDICTION MODELING FOR DETECTION OF DATA STORAGE DEVICE FAILURES

(71) Applicant: Seagate Technology LLC, Cupertino, CA (US)

(72) Inventors: Nicholas Scott Eggert, South Saint Paul, MN (US); Wenjuan Wang, Edina, MN (US); Sailaja Venkata Chilaka, Edina, MN (US); Satya V. Allumallu, Chanhassen, MN (US); Jason M. Feist, Shakopee, MN (US); Bruce D. Emo, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 144 days.

(21) Appl. No.: 15/253,103

(22) Filed: Aug. 31, 2016

(65) Prior Publication Data

US 2018/0060192 A1    Mar. 1, 2018

(51) Int. Cl.
G06F 11/00    (2006.01)
G06F 11/16    (2006.01)
G06F 11/30    (2006.01)
G06F 11/34    (2006.01)

(52) U.S. Cl.
CPC ...... G06F 11/1662 (2013.01); G06F 11/3034 (2013.01); G06F 11/3409 (2013.01); G06F 11/3495 (2013.01)

(58) Field of Classification Search
CPC ............ G06F 11/1662; G06F 11/3495; G06F 11/3409; G06F 11/3034; G06F 3/0683; G06F 3/0653; G06F 3/065; G06F 3/0619

USPC ........................................................ 714/6.3
See application file for complete search history.

(56) References Cited

U.S. PATENT DOCUMENTS

| | | | |
|---|---|---|---|
| 5,828,583 A | 10/1998 | Bush et al. | |
| 5,914,967 A | 6/1999 | Yomtoubian | |
| 6,600,614 B2 | 7/2003 | Lenny et al. | |
| 6,892,276 B2 | 5/2005 | Chatterjee et al. | |
| 6,910,047 B1 * | 6/2005 | Boucher ........... | G06F 17/30345 |

(Continued)

OTHER PUBLICATIONS

Victor Agrawal, Chiranjib Bhattacharyya, Thirumale Niranjan and Sai Susarla, "Discovering Rules from Disk Events for Predicting Hard Drive Failures," pp. 1-5, Bangalore, India.

(Continued)

*Primary Examiner* — Yair Leibovich
(74) *Attorney, Agent, or Firm* — Hall Estill Attorneys at Law (57) ABSTRACT

Method and apparatus for predicting data storage device failures using adaptive failure prediction modeling. In some embodiments, monitored parameters are used to predict a potential imminent failure of a first data storage device using a first copy of a first failure prediction model (FPM). Data associated with the predicted potential imminent failure are transferred by the device across a computer network to a host device. The host device generates an updated, second FPM responsive to the transferred data as well as from data from at least a second data storage device transmitted across the computer network having a second copy of the first FPM. A first copy of the updated, second FPM is transferred, via the network, for use by the second data storage device.

20 Claims, 6 Drawing Sheets

(56) References Cited

U.S. PATENT DOCUMENTS

| | | | |
|---|---|---|---|
| 7,236,911 B1* | 6/2007 | Gough | G06F 11/008 360/75 |
| 7,350,046 B2 | 3/2008 | Sicola et al. | |
| 7,474,989 B1 | 1/2009 | Wilcoxon | |
| 7,526,684 B2 | 4/2009 | Bicknell et al. | |
| 7,721,157 B2 | 5/2010 | Spitz et al. | |
| 7,921,332 B2 | 4/2011 | Lee | |
| 8,140,914 B2 | 3/2012 | Murphy et al. | |
| 8,972,799 B1 | 3/2015 | Brooker et al. | |
| 9,081,656 B2 | 7/2015 | Yingling, Jr. et al. | |
| 9,542,296 B1* | 1/2017 | Engers | G06F 11/3452 |
| 10,147,048 B2* | 12/2018 | Chen | G06F 11/00 |
| 2004/0088456 A1 | 5/2004 | Zhang | |
| 2007/0006048 A1 | 1/2007 | Zimmer et al. | |
| 2007/0032964 A1* | 2/2007 | Kaldor | G01N 33/2888 702/25 |
| 2008/0068755 A1* | 3/2008 | Aoyagi | G11B 25/043 360/137 |
| 2008/0209274 A1* | 8/2008 | Nicholson | G06F 11/008 714/37 |
| 2014/0244552 A1 | 8/2014 | Liu et al. | |
| 2015/0074450 A1 | 3/2015 | Blount et al. | |
| 2015/0205657 A1 | 7/2015 | Clark | |

OTHER PUBLICATIONS

Christopher Brumgard and Micah Beck, "Substituting Disk Failure Avoidance for Redundancy in Wide Area Fault Tolerant Storage Systems," 2012 IEEE International Conference on Cluster Computing Workshops, 2012, pp. 25-31, IEEE, US.

Dr. Amit Chattopadhyay, "Hard Disk Drive—Reliability Overview," Power Point Presentation by Chattopadhyay at Western Digital Technologies, Inc., 2012, pp. 1-48, Western Digital Technologies, Inc., San Jose, CA.

Moises Goldszmidt, "Finding Soon-to-Fail Disks in a Haystack," Microsoft Research, pp. 1-5, US.

Greg Hamerly and Charles Elkan, "Bayesian Approaches to Failure Prediction for Disk Drives," Proceedings of the Eighteenth International Conference on Machine Learning, Jun. 2001, pp. 1-8, US.

Jing Li, Xinpu Ji, Yuhan Jia, Bingpeng Zhu, Gang Wang, Zhongwei Li and Xiaoguang Liu, "Hard Drive Failure Prediction Using Classification and Regression Trees," pp. 1-12, China.

Joseph F. Murray, Gordon F. Hughes and Kenneth Kreutz-Delgado, "Machine Learning Methods for Predicting Failures in Hard Drives: A Multiple-Instance Application," Journal of Machine Learning Research 6, May 2005, pp. 783-816, US.

N. Muthumani and R. Antony Selvadass Thanamani, "Optimizing Hidden Markov Model for Failure Prediction—Comparison of Gaine's Optimization and Minimum Message Length Estimator," International Journal on Computer Science and Engineering (IJCSE), Feb. 2011, pp. 892-898, vol. 3, No. 2.

Eduardo Pinheiro, Wolf-Dietrich Weber and Luiz Andre Barroso, "Failure Trends in a Large Disk Drive Population," in Proceedings of the 5th USENIX Conference on File and Storage Technologies (FAST "07), Feb. 2007, pp. 1-13, US.

Teerat Pitakrat, Andre Van Hoorn and Lars Grunske, "A Comparison of Machine Learning Algorithms for Proactive Hard Disk Drive Failure Detection," Power Point presentation for ISARCS 2013, pp. 1-35.

Felix Salfner, Maren Lenk and Miroslaw Malek, "A Survey of Online Failure Prediction Methods," ACM Journal Name, pp. 1-68, vol. V, No. N.

Saunhita Sapre and Annapurna Patil, "A Proactive Drive Reliability Model to Predict Failures in the Hard Disk Drives," Proceedings of 13th IRF International Conference, Jul. 2014, pp. 123-129, Pune, India.

Loon-Ching Tang, Shao-Wei Lam, Quock-Y Ng and Ring-Shi Goh, "Efficient Reliability Predictions of Particle-Induced Failures in HDDS," IEEE, 2007, pp. 1-6.

Teik-Toe Teoh, Siu-Yeung Cho and Yok-Yen Nguwi, "Hidden Markov Model for Hard-Drive Failure Detection," The 7th International Conference on Computer Science & Education (ICCSE 2012) Jul. 2012, pp. 3-8, IEEE, Australia.

George W. Tyndall, "Role of the Head Disk Interface in HDD Reliability," Samsung power point presentation, pp. 1-29, San Jose, CA.

Bingpeng Zhu, Gang Wang, Xiaoguang Liu, Dianming Hu, Sheng Lin and Jingwei Ma, "Proactive Drive Failure Prediction for Large Scale Storage Systems," in 29th IEEE Conference on Massive Storage Systems and Technologies (MSST), 2013, pp. 1-5, Long Beach, CA.

\* cited by examiner

ADAPTIVE FAILURE PREDICTION MODELING FOR DETECTION OF DATA STORAGE DEVICE FAILURES

SUMMARY

Various embodiments of the present disclosure are generally directed to a method and apparatus for predicting data storage device failures using adaptive failure prediction modeling.

In some embodiments, monitored parameters are used to predict a potential imminent failure of a first data storage device using a first copy of a first failure prediction model (FPM). Data associated with the predicted potential imminent failure are transferred by the device across a computer network to a host device. The host device generates an updated, second FPM responsive to the transferred data as well as from data from at least a second data storage device transmitted across the computer network having a second copy of the first FPM. A first copy of the updated, second FPM is transferred, via the network, for use by the second data storage device.

In other embodiments, a method includes steps of manufacturing a first plurality of nominally identical data storage devices and collecting failure prediction model (FPM) data from each of the first plurality of nominally identical data storage devices; using the collected FPM data to generate a first FPM by way of an FPM generation processing circuit, the first FPM representing programmable instructions storable in a local memory of the associated data storage device and executable by a local processor of the associated data storage device to provide a notification of a potentially imminent failure event based on subsequently generated FPM data generated by the associated data storage device; storing a separate copy of the first FPM generated by the FPM generation processing circuit in the local memory of each of the first plurality of nominally identical data storage devices; shipping each of the first plurality of nominally identical data storage devices to an end user and operating said devices in an associated end user environment to store data from a local host device; executing the associated copy of the first FPM by the local processor of each of the first plurality of nominally identical data storage devices to evaluate operation of the associated data storage device responsive to the subsequently generated FPM data; transmitting the subsequently generated FPM performance data from each of the first plurality of nominally identical data storage devices to the FPM generation processing circuit by way of a network connection; transmitting failure notification data from at least a selected one of the first plurality of nominally identical data storage devices to the FPM generation processing circuit by way of the network connection; using the transmitted, subsequently generated FPM performance data from each of the first plurality of nominally identical data storage devices and the transmitted failure notification data from the at least a selected one of the first plurality of nominally identical data storage devices by the FPM generation processing circuit to generate an enhanced, second FPM; and loading an associated copy of the second FPM into the local memory of each of the first plurality of nominally identical data storage devices.

These and other features of various embodiments can be understood with a review of the following detailed description in conjunction with the accompanying drawings.

DETAILED DESCRIPTION

The present disclosure is generally directed to data storage systems, and more particularly to predicting data storage device failures using adaptive failure prediction modeling.

Data storage devices store and retrieve data from a host device in a fast and efficient manner. Such devices are often provided with a top level control circuit (controller) and one or more forms of data storage media, such as rotatable magnetic recording media (discs) in hard disc drives (HDDs) or solid-state memory cells in solid-state drives (SSDs). Hybrid solid state drives (HSSDs) utilize both forms of memory.

HDDs and other forms of rotatable media storage devices generally arrange the rotatable media to rotate at a constant angular velocity. An array of data read/write transducers (heads) move across the recording surfaces of the media to write and read data to fixed sized sectors arranged along concentric data tracks. Embedded servo data may be supplied on the recording surfaces to provide positional information used by a servo control circuit to maintain the transducers in a desired relation to the data tracks.

Some HDDs and other forms of data storage devices incorporate reliability monitoring systems to enhance the reliability and availability of the devices to end users. Such systems, sometimes referred to as SMART (Self-Monitoring, Analysis and Reporting Technology) systems, generally operate to monitor and log various parameters associated with the ongoing operation of the associated storage device. The parameters may be processed using an algorithm or other mechanism that compares accumulated parametric values to various thresholds that have been correlated to potential failure events. For example, an increase in the magnitude of a given parameter over time, such as a head electrical resistance value, may signal an impending failure event for that head in the near future.

In this way, a SMART system can operate to provide a notification to a user that a potential failure of the device is potentially imminent. This allows the user to take corrective actions such as transferring the data stored on the device to another device, replacing the device, altering an operational loading level or an operational setting of the device, etc. As such, SMART systems are usually self contained systems that are implemented at the device level and involve notifications to the local user.

While operable, these and other forms of current generation reliability monitoring systems do not generally exhibit a high level of accuracy during operation. This can be established by the fact that, as a rule, a large percentage of storage devices returned to the manufacturer because of SMART system failure notifications are often found to be operative and are not actually experiencing a failure or degraded operational condition. SMART systems are thus prone to a high number of false positives, which increases cost and frustration at the customer level due to the unnecessary replacement of good storage devices, as well as increased costs to the manufacturer for unnecessary warranty repairs and replacements.

One reason that SMART systems do not generally exhibit accurate performance in predicting imminent failures relates to the complex nature of the user environment for data storage devices. A number of factors external to the devices can provide different SMART performance outcomes for otherwise identical drives. These factors can include differences among host operating systems, software applications, device work-loads, temperature and vibratory environments, altitudes, data types, input power quality, and so on. In addition, nominally identical and fully operational devices can exhibit a number of different operational parameters including channel settings, transducer fly heights, motor performance, reader and writer response characteristics, etc., making it difficult to accurately establish a common set of thresholds for such parameters that are statistically correlated to a likely failure event.

While SMART systems can incorporate some measure of intelligence in monitoring parameters, including systems that rely on averaging changes in operational parameters over time, it is difficult to select appropriate baseline levels of performance for a wide variety of different parameters and measurements and to determine appropriate thresholds in which to set a notification alarm. Added to this difficulty is the fact that some customers may require different user selectable sensitivities, such that some devices that indicate failure in one type of environment will not do so in a different environment. Customers and manufacturers must thus balance the level of risk of encountering a catastrophic failure event without warning against the unnecessary replacement and processing of still valid and well operating devices.

Accordingly, various embodiments of the present disclosure are generally directed to an apparatus and method for using adaptive failure prediction modeling to enhance failure predictions in data storage devices. Such techniques can be utilized in conjunction with an existing SMART type reliability monitoring system, but operate largely independently of and in a different manner to provide predicted failure notifications.

As explained below, some embodiments are generally directed to a high powered processing circuit at a central location, such as at a manufacturer of data storage devices, which generates an initial failure prediction model (FPM) for a population of nominally identical data storage devices based on performance data obtained from an initial run of devices. The FPM can incorporate a variety of well known system modeling and analysis techniques including the use of neural nets, learning systems, decision trees, etc. Once formulated off line, the initial FPM is loaded to an appropriate memory and utilized by an on-board processing circuit in each data storage device to evaluate subsequent performance data generated by the associated device.

The devices are shipped to respective end user (field) environments and are operated as required to store and retrieve end user data. The processing circuit at the central location receives updated performance data from the population of devices over appropriate network connections, including (periodic) failure notifications based on the local FPM. Based on the large population of performance data and at least some failure notifications obtained from the devices after an extended period of field use, the processing circuit enhances the model to produce an updated FPM. The updated FPM is thereafter loaded into the population of good devices in the field, such as by way of a firmware (FW) update. The updated FPM is also loaded to newly produced data storage devices that are thereafter manufactured and shipped to the field.

In this way, a tunable prediction model is provided in each data storage device in a population of nominally identical devices. The model may be operated by an available processor (such as the top level programmable controller) with associated programming in memory. The model is fed parametric measurements from a variety of sources in real time. Complex modeling may be utilized, such as classification models (e.g., logistic regression, support vector machines, decision trees, etc.) and unsupervised learning models (hidden Markov models, neural nets, etc.). Various well known metrics such as Mahalanobis distance may be incorporated into these or other models.

The modeling allows each individual device to report potential upcoming failures to a local user, in a manner similar to the way in which SMART systems operate. In addition, as noted above the real world failure information is passed back to a central location (e.g., the processing server), which uses the information from real world failures and predicted failures to improve the model. The improved model is thereafter uploaded to the drives in the field as part of a normal FW upgrade. As desired, different FPM models can be generated for statistically different end use environments (e.g., certain customers, certain operating systems, etc.).

In some embodiments, further information flows to the processing circuit used to generate the enhanced FPM from failed devices that have been physically returned, such as in the case of warranty repairs. Devices that have been returned from the field due to predicted or actual failures are evaluated to see what actually happened to the device, including efforts to recreate the failure. In this case, the model is updated in two ways—from data reporting from the field showing what is being detected and predicted (both good and bad), and from warranty analysis of returned devices to see what false positives and confirmed failures are being identified.

It will be appreciated that while the initial FPM can be turned and enabled based on relatively small data sets that can be generated during a particular device development process, the effectiveness of the FPM can be significantly improved by using large data sets available from the field. Unsupervised learning models are particularly suitable for use in the model generation process, and can acquire high levels of effectiveness based on the large data sets that are only available using field data for a large population of devices.

Figure 1:
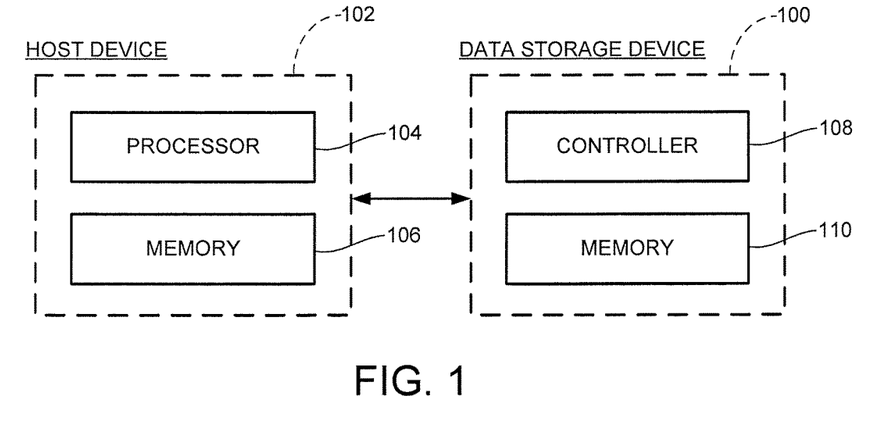
FIG. 1 is a simplified functional block diagram of a data storage device in communication with a host device in accordance with various embodiments of the present disclosure.

These and other features and considerations can be understood beginning with a review of FIG. 1 which provides a simplified representation of a data storage device 100 of the type used to store and retrieve user data from a host device 102. The host device 102 can take the form of substantially any form of computer processing device adapted to communicate with the data storage device, including a computer, laptop, tablet, smart phone, gaming console, workstation, etc. The host device 102 is shown to include a top level programmable processor 104 and associated processor memory 106. The host device 102 may incorporate other modules as well.

The data storage device 100 includes a controller (control circuit) 108 and a memory module 110. The controller 108 is a hardware or programmable processor based control circuit that provides top level communication and control functions as the device interfaces with the host device 102. In the case of a hardware processor, various logic circuit gates and other hardware circuit elements may be provided to carry out the various required functions such as in the form of a hardware state machine. In the case of a programmable processor, suitable programming instructions may be stored in a memory and executed by the processor as required to carry out the requisite functions.

Data from the host device 102 are transferred for storage in the memory 110 responsive to a host write command, and returned back to the host from the memory responsive to a host read command. The memory can take a variety of focus, including rotatable storage media as set forth in FIG. 2.

Figure 2:
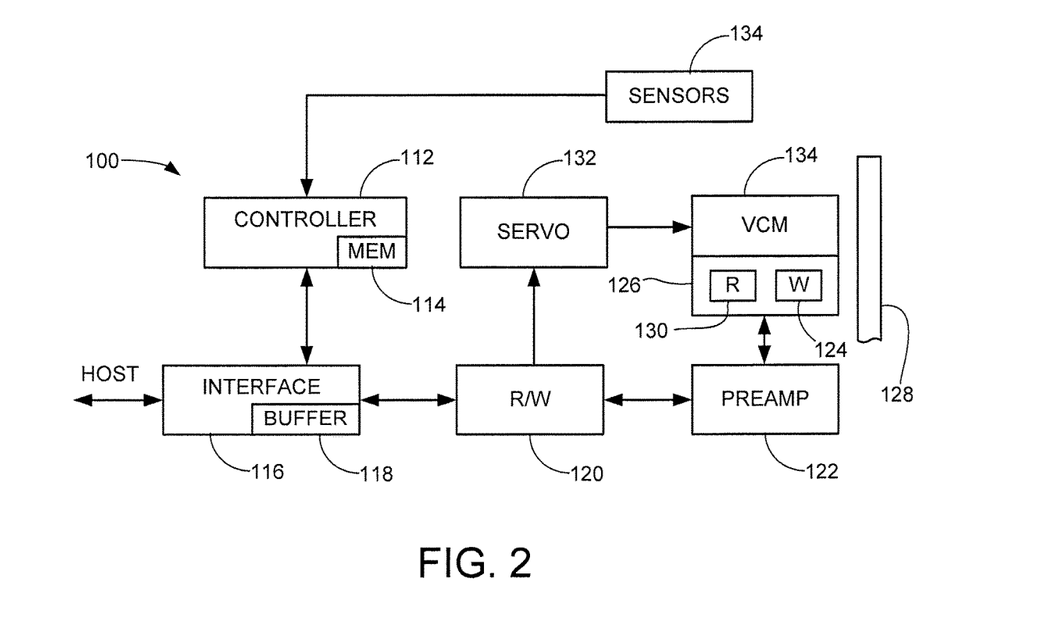
FIG. 2 is a schematic representation of aspects of the data storage device of FIG. 1 characterized as a hard disc drive (HDD) in accordance with some embodiments.

FIG. 2 is a generalized functional representation of the data storage device 100 of FIG. 1 in accordance with some embodiments. The internal architecture can vary as required so FIG. 2 is meant to convey a general overview of various systems, circuits and components. Other forms can be used.

The device 100 in FIG. 2 is characterized as a hard disc drive (HDD), although such is merely exemplary and is not limiting as the techniques discussed herein can be used with any number of different types of data storage devices, including solid state drives (SSDs), hybrid data storage devices (HDSDs), etc.

The HDD 100 includes a top level controller (control circuit) 112, which may correspond to the controller 108 in FIG. 1. In the case of a programmable processor control circuit, the processor utilizes various programming instructions and data stored in a controller memory (mem) 114.

A host interface circuit 116 provides communications with the external host device 102 under the direction of the controller 112, including the processing of data transfers, commands, status requests, etc. Data formatting operations and other functions may be executed by the interface.

A buffer memory 118 provides for the temporary storage of user data pending transfer to/from the host, and may store other data as well. In some cases, the controller memory 114 may be incorporated into the buffer 118. The buffer may include volatile memory (e.g., DRAM) and non-volatile memory (e.g., flash memory).

A read/write (R/W) channel circuit 120 provides signal conditioning during write and read operations. User data to be written by the device 100 are encoded by a write portion of the channel 120 such as via encryption, compression, run length limited (RLL) encoding, error detection and correction (EDC) encoding, etc. Encoded data are supplied to a preamplifier/driver (preamp) circuit 122 which applies bi-directional, time varying write currents to a write element (W) 124 of a data transducer 126. The write element 124 may take the form of a perpendicular write coil that writes a corresponding sequence of magnetic flux transitions to tracks defined on a rotatable recording medium (disc) 128.

During a read operation to recover previously written data, a read element (sensor) 130 of the transducer 126 detects the magnetic pattern to generate a readback signal that is preamplified and conditioned by the preamp 122 and forwarded to the channel 120. A read portion of the channel 120 applies signal processing to the recovered signal including detection, decoding, decryption, decompression, error detection and correction, etc. to output the originally stored data to the buffer 118. The interface 116 thereafter facilitates a transfer of the data to the requesting host. The read sensor 130 can take a variety of forms, such as a magneto-resistive (MR) sensor or the like.

A servo control circuit 132 operates to position the respective write and read elements 124, 130 adjacent the disc 128 during read and write operations. Servo data written to the disc 128 are detected by the read sensor 130, demodulated by the channel 120 and processed by the servo control circuit 132 to generate a position signal indicative of the radial position of the read sensor. A corresponding current command signal is input to a voice coil motor (VCM) 134 affixed to the transducer 126 to adjust the position of the transducer accordingly. The transducer 126 and VCM 134 may be supported by a swing arm type rotary actuator.

One or more sensors (collectively represented at 136) provide environmental sensor inputs to the controller 112. Example sensors may include temperature sensors to provide device temperature measurements, accelerometers adapted to detect mechanical shock and vibration events, power line monitoring circuits to monitor input power voltage and current characteristics, acoustic sensors to detect device acoustic noise generation, event timers to measure elapsed time between certain events (e.g., time to initialize), etc. Any number of different types of sensors can be used based on the application. For example, a rotatable media application such as the HDD may be more susceptible to mechanical shock and vibration as compared to an SSD, and so enhanced sensor inputs may be suitable to signal rotatable vibration, dropped events, bearing noise, etc. in an HDD as compared to an SSD.

Figure 3:
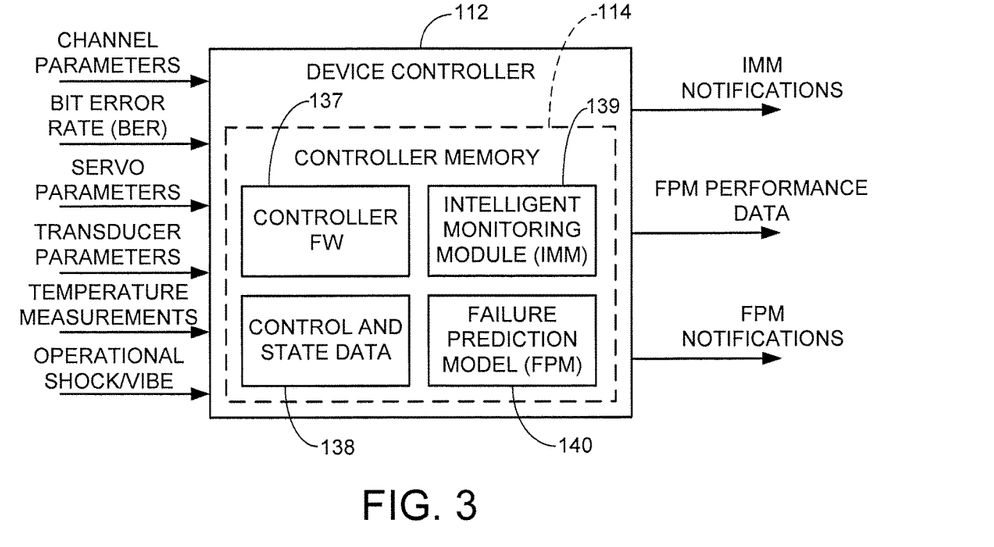
FIG. 3 is a functional block diagram of relevant aspects of the device controller of FIG. 2 to illustrate intelligent monitoring module (IMM) and failure prediction model (FPM) capabilities of the controller in accordance with some embodiments.

FIG. 3 is a functional block representation of the device controller 112 from FIG. 2 in accordance with some embodiments. The controller memory is denoted by a dashed box 114. The controller memory 114 stores a number of operational modules including controller firmware (FW) 137, control and state data 138, an intelligent monitoring module (IMM) 139, and a failure prediction model (FPM) 140. Other programming and data modules may be stored by the controller memory 114 as well.

Generally, the controller 112 includes one or more programmable processors that execute the controller firmware 137 and utilize the control and state data 138 during normal device operation in transferring data to and from the host device 102. The IMM 139 operates as a SMART monitoring system to accumulate and monitor various system parameters of the device 100. Exemplary parameters shown in FIG. 3 include channel parameters, measured bit error rates (BERs), servo parameters, transducer parameters (including head read and write values), temperature measurements and operational shock and vibration (vibe) measurements.

Figure 4:
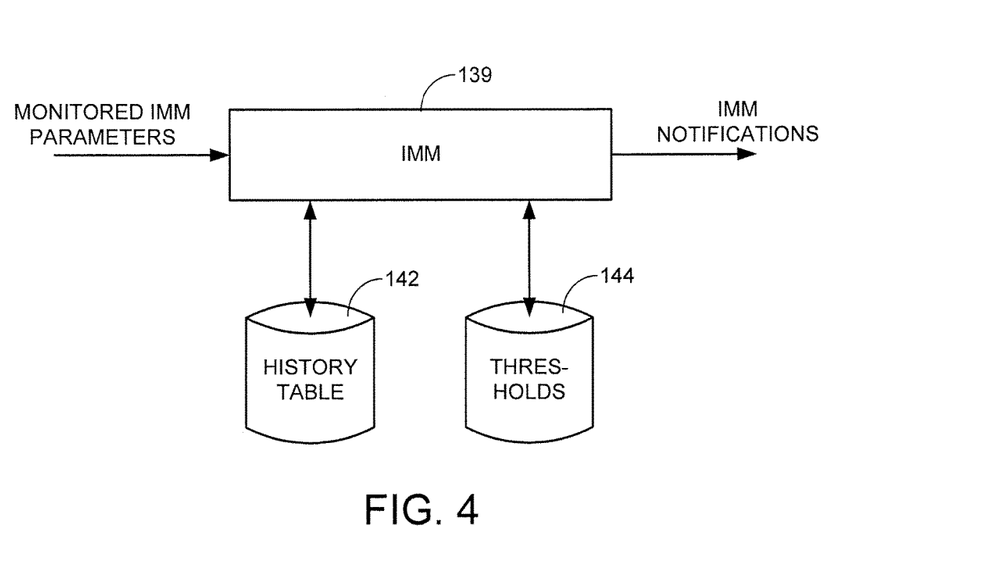
FIG. 4 illustrates operation of the IMM from FIG. 3 in some embodiments.

As further depicted in FIG. 4, substantially any number of monitored IMM parameters can be used to provide SMART system (IMM) notifications to the local user of potentially imminent failure conditions. The IMM can include a history table 142 as a data structure in local memory (such as the memory 114) that tracks the various parameters over time. Moving window averages can be calculated and compared against baseline thresholds, represented as stored values at 144, to generate the imminent failure notifications. It will be noted that the use of a SMART monitoring system such as the IMM 139 is contemplated but is optional in accordance with various embodiments.

The FPM 140 from FIG. 3 comprises a local failure prediction model that is executed in the background by the controller 112. The FPM 140 receives a number of parameters, or performance data, as inputs from the device 100. The performance data fed to the FPM may include parameters that are also utilized by the IMM 139, or separate parameters may be evaluated by these respective systems.

Figure 5:
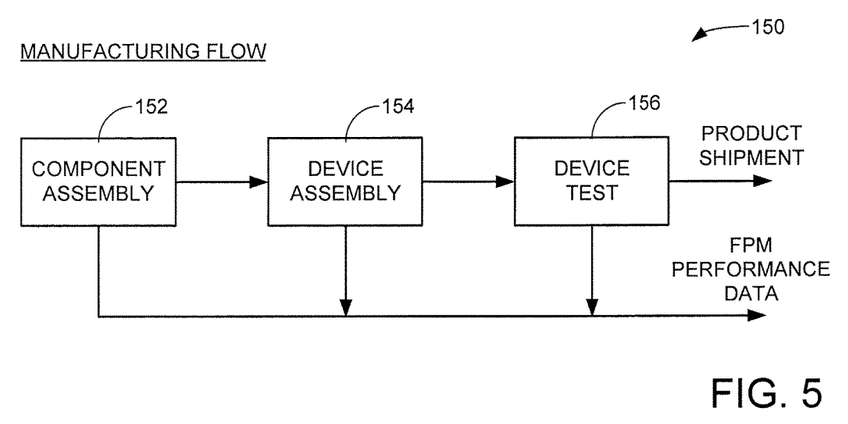
FIG. 5 illustrates collection of FPM performance data during a manufacturing process used to manufacture a population of storage devices nominally identical to the device in FIG. 2.

FIG. 5 represents a manufacturing flow 150 that can be used to produce a population of data storage devices nominally identical to the device 100 shown in FIGS. 1-2. Various processing steps may be carried out including a component level assembly operation 152 in which individual components are assembled, a device assembly operation 154 in which the final devices are assembled from the assembled components, and a device test operation 156 in which the completed devices are subjected to extended testing and formatting operations. Other process flows may be used. As shown in FIG. 5, various FPM performance data may be collected and used from each of these different operations to build the initial failure prediction model (FPM 140).

Figure 6:
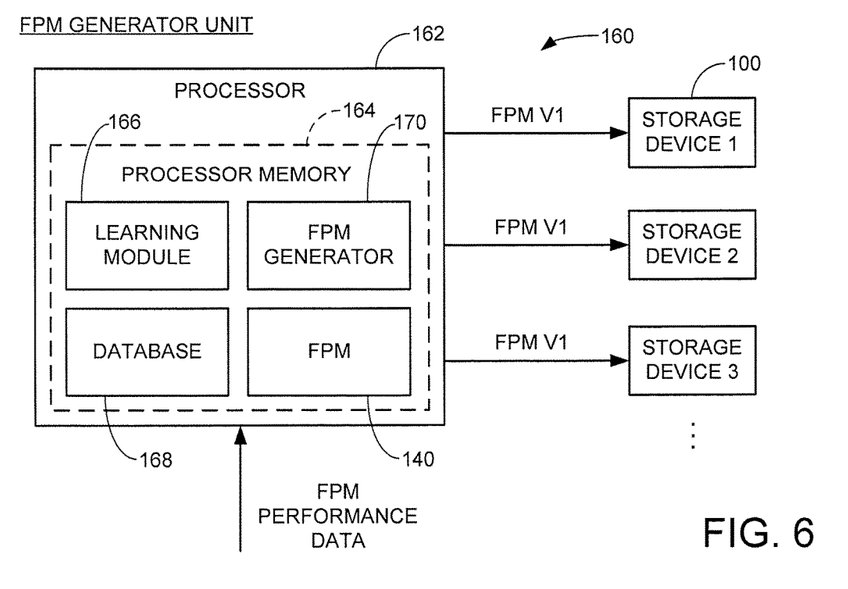
FIG. 6 is a block diagram for an FPM generator unit as a host device that generates a first version of the FPM and loads the same into a population of devices.

FIG. 6 shows an FPM generator unit 160 in accordance with some embodiments. The FPM generator unit 160 may take the form of a computer, workstation, laptop, programmable logic device, multiple networked processors, etc. While not necessarily required, the unit 160 forms a portion of the manufacturing flow 150 and accumulates the FPM performance data from the various manufacturing steps shown in FIG. 5.

As depicted in FIG. 6, the unit 160 includes a processor 162 and associated processor memory 164. The processor memory stores various programming and data sets used by the processor, including a learning module 166, database 168, an FPM generator 170, and a resident copy of the produced FPM 140 (see FIG. 3). This initial FPM 140 is denoted as a first version (FPM V1) and is loaded to a population of storage devices 100 (storage devices 1-3 in FIG. 6).

Figure 7:
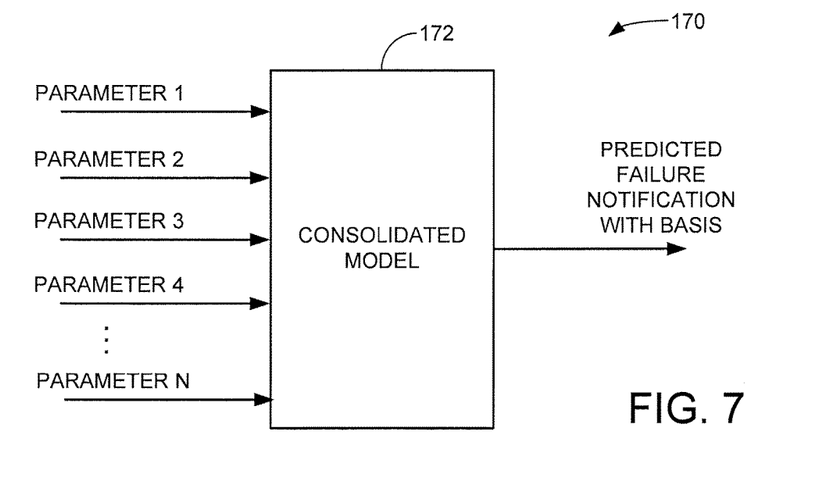
FIG. 7 shows the use of a consolidated model as the FPM.

Any number of mathematical modeling techniques as known in the art can be used by the FPM generator 170. In some embodiments, the generated FPM model may combine multiple parameters into a combined learning system (analogous to a bloom filter) with respective weightings applied to different input parameters, such as illustrated by the consolidated model 180 in FIG. 7. The consolidated model receives parameters identified as parameters 1 through N and, based on various weightings of these parameters and other algorithmic processing, an output notification is generated that signals imminent failure of the device, along with a basis for such failure prediction. The basis for the failure prediction includes information signaling to the receiving system the basis upon which the failure prediction was made, such as which parameter, or combination of parameters, or which affected subsystems, are involved in the failure prediction. Generally, the more information available to help pinpoint the cause of the failure declaration, the better.

Figure 8:
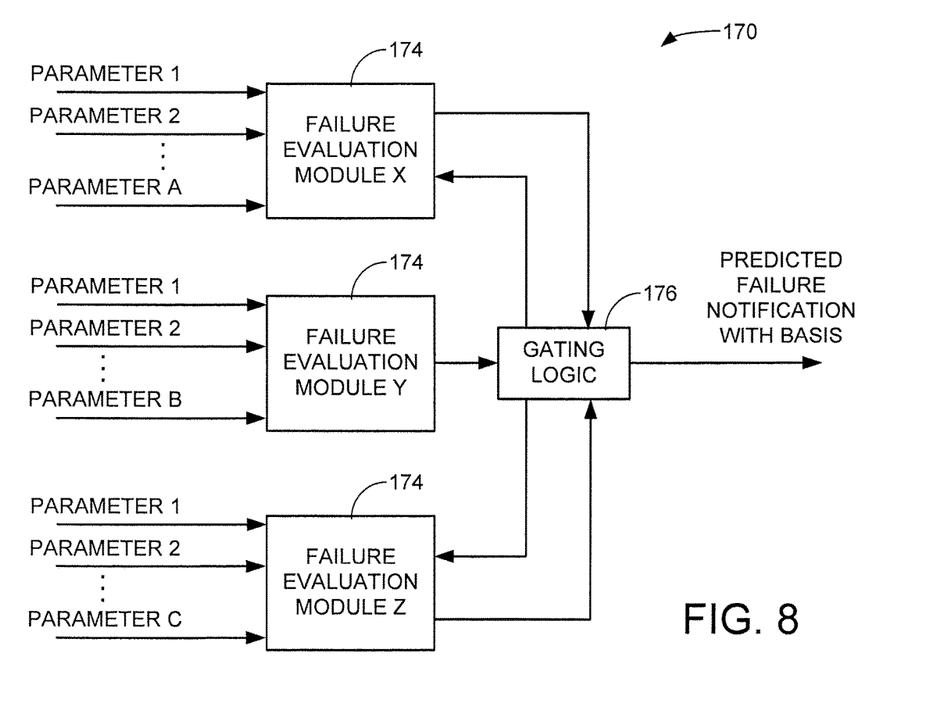
FIG. 8 shows the use of a bifurcated model as the FPM.

An alternative arrangement for the failure prediction modeling unit 170 is provided in FIG. 8. FIG. 8 shows a number of individual failure evaluation modules 174 (in this case, modules A-C) each configured to evaluate a separate set of input parameters (or FPM performance data sets). Some input parameters may be evaluated by multiple ones of the individual failure evaluation modules 174. FIG. 8 thus represents a bifurcated model wherein individual failure evaluation modules each separately make failure prediction determinations on subsets of the total number of the input parameters, and the gating logic function makes a final determination on whether to issue a predicted failure notification.

In this case, multiple, separate and substantially independent failure prediction modules operate in tandem to monitor various different sets of input parameters. A gating logic 176 is used such that any one of the modules may predict a failure and result in a failure notification, but such declaration may be dependent upon multiple variables. Interdependencies may exist between modules, as is common in known learning type modules, hence the use of the gating function block 176 to ultimately declare a predicted failure notification, along with the associated basis.

Those skilled in the art will recognize that any number of suitable mathematical techniques can be employed by the FPM generator 170, as required by the constraints of a given application. Example techniques that can be employed include classification modeling such as via Mahalanobis distance, support vector machines, decision trees, etc., and unsupervised learning models such as provided by hidden Markov models, neural nets, etc.

Without limitation, the various forms of parameters (FPM performance data) can be tailored to what is most efficient with regard to the FPM modeling process. Examples can include but are not limited to device aging, accumulated power cycles, bit error rates (BER), time to initialize (elapsed time from power on to a fully operational state), channel quality parameters, rate of disc defects (e.g., grown thermal asperities), head read/write element resistance characteristics, temperature, altitude, levels of mechanical shock and vibration, PW50 (signal processing pulse widths), power fluctuations, head fly heights, acoustic output levels, motor speed variations, off track detections, and many more.

Generally, by providing a large set of inputs, an adaptive system can begin to detect statistically significant correlations between those inputs and desired outputs/failure conditions. It is contemplated that the population of storage devices involved in the initial run of customer evaluation, demonstration and early production units can provide a sufficient supply of performance data to teach the FPM unit 170 to arrive at a valid, initial failure prediction model 140, which is subsequently loaded to and utilized by the earliest shipped units to the field.

Figure 9:
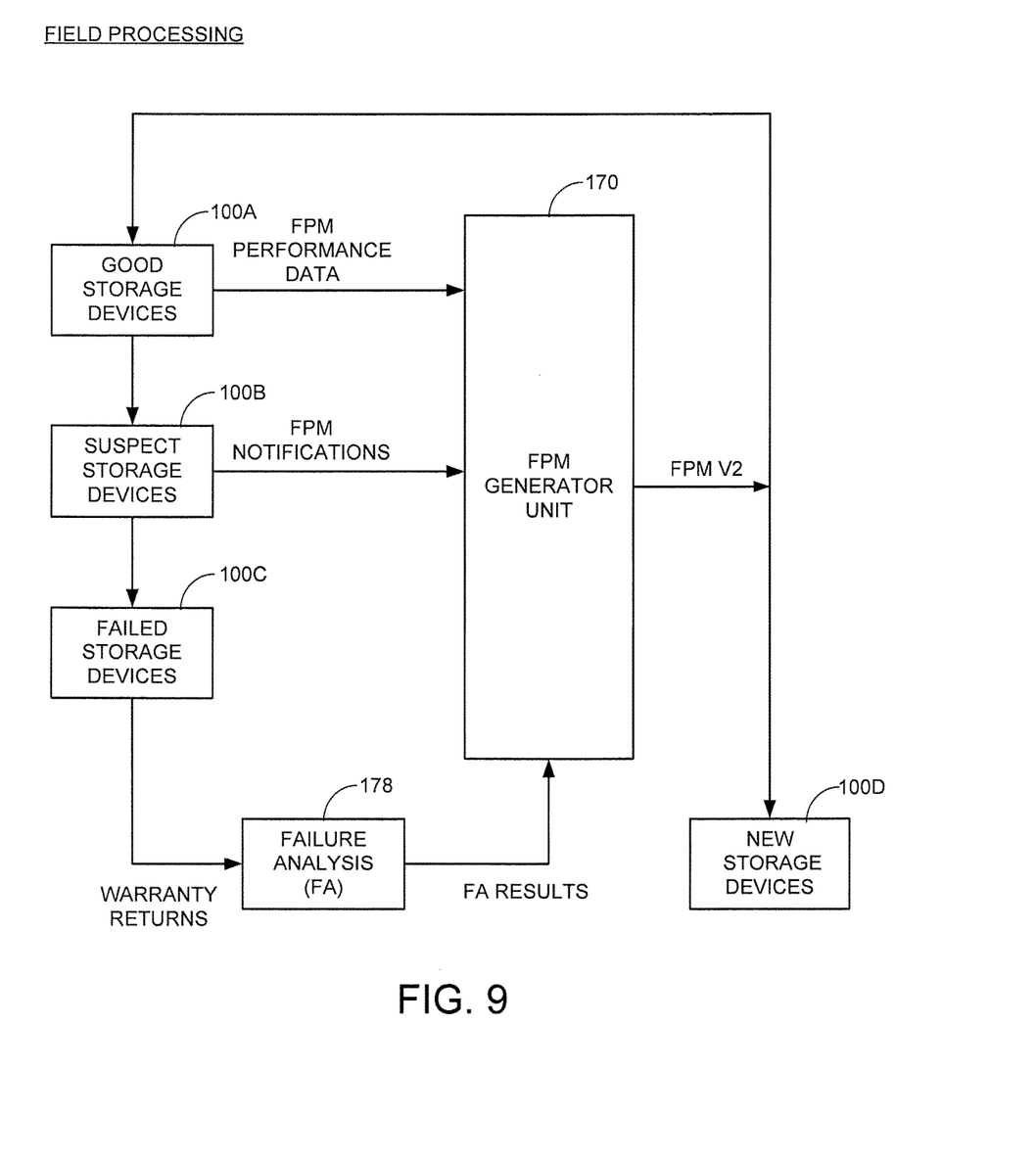
FIG. 9 is a flow diagram that illustrates a manner in which a new, enhanced version of the FPM can be generated and loaded into new and existing storage devices during field use.

FIG. 9 provides a schematic representation of the real value of the system, which involves subsequently obtaining and utilizing continued performance data from a wide variety of data storage devices in order to enhance the existing FPM to achieve one or more subsequent versions that provide enhanced failure prediction performance. More particularly, FIG. is a block diagram of a supply and control system in which good storage devices, numerically designated as a class as 100A, are manufactured in accordance with FIG. 7 and are shipped to the field having the first version of the FPM model (FPM V1) as indicated in FIG. 8. These devices 100A operate, from time to time, to communicate accumulated FPM performance data back to the FPM generator unit 170 at the central location. Such communications may include the accumulation of various parameters listed above over time and a transfer of such data, via a suitable network, back to the FPM generator unit 170.

From time to time, those devices that have been shipped and are now operating in the field will signal a potential failure condition based on the initial FPM 140. These devices are indicated at 100B in FIG. 9. Such declarations or notifications will arise based on the input of the parametric values being generated by such devices as evaluated by the on-board FPM 140. These notifications are also transmitted, via a suitable network, back to the FPM generator unit. The notifications may also include a large scale data dump of large amounts of history data associated with the devices 100B (referred to herein as "suspect storage devices").

It will be understood that those devices having such notifications may, or may not, be removed from further field service at this time. In some embodiments, a corresponding notification is provided to the local user to enable the user to decide whether to continue use of the suspect storage devices 100B, or to remove them from service (or alter their operational state, such as by decommissioning certain disc/head combinations, etc.). In other embodiments, the notifications are sent solely to the central processing unit (e.g., unit 170) without local notification.

Continuing with FIG. 9, a third class of storage devices is identified as failed storage devices 100C. This class of storage devices represents those devices that have in fact undergone an actual failure condition, or those devices that have been removed by the user as a result of either the FPM notifications or a separate SMART system based notification of pending failure.

The failed devices 100C are returned to the manufacturer for failure analysis (FA) processing, as indicated at block 178. This may involve various steps such as a controlled tear down, analysis and testing of the returned storage devices in order to identify and detect the failure condition or conditions that resulted in the device failure (or declared imminent failure). FA results, whether confirmed or inconclusive, are further provided to the FPM generator unit 170.

In this way, the FPM generator unit 170 receives at least three different types of information to aid this system in developing the next generation failure prediction model (FPM V2). The first form of information is the FPM performance data accumulated from the population of good devices 100A. The second form of information is the FPM notifications (along with the associated bases for such notifications, as well as accumulated FPM performance data) from the suspect storage devices 100B. The third form of information is the FA results from actually failed devices 100C, pursuant to the investigations carried out by the FA block 178. The periodicity with which new FPMs are generated can vary; in some cases, data may be accumulated for a selected period of time, such as every 90 days or some other interval, after which a new model is generated.

As further shown in FIG. 9, the new model (e.g., FPM V2) is generated and uploaded to a new class of currently manufactured storage devices 100D. The new update may further by provided, such as via an offered FW update, to the existing class of good devices 100A that are still resident in the field. The foregoing processing continues using the new version of the failure prediction model, with further enhancements made on a periodic basis as required. Complex modeling may be utilized to generate each version of the FPM, such as classification models (e.g., Mahalanobis distance, support vector machines, decision trees, etc.) and unsupervised learning models (hidden Markov models, neural nets, etc.). These and other techniques are well known to those skilled in the art.

In this way, currently good performing devices in the field may, over their respective lifetimes, continue to supply FPM performance data to the central processor (e.g., unit 170) and receive continual updates and enhancements to the FPM modeling utilized by the local devices. Over time, the adaptive nature of the FPM process will tend to provide an accurate failure prediction model for a number of different devices. In some cases, the FPM performance data can be segregated by source or operational environment. For example, data from a particular customer environment can be used to tailor a particular FPM for that environment. In other cases, certain types of operating systems, applications or other commonalities can be used to group FPM performance data and provide models suitable for such environments. Thus, the reports provided from the devices in the fields can include other information regarding the environment as well.

Figure 10:
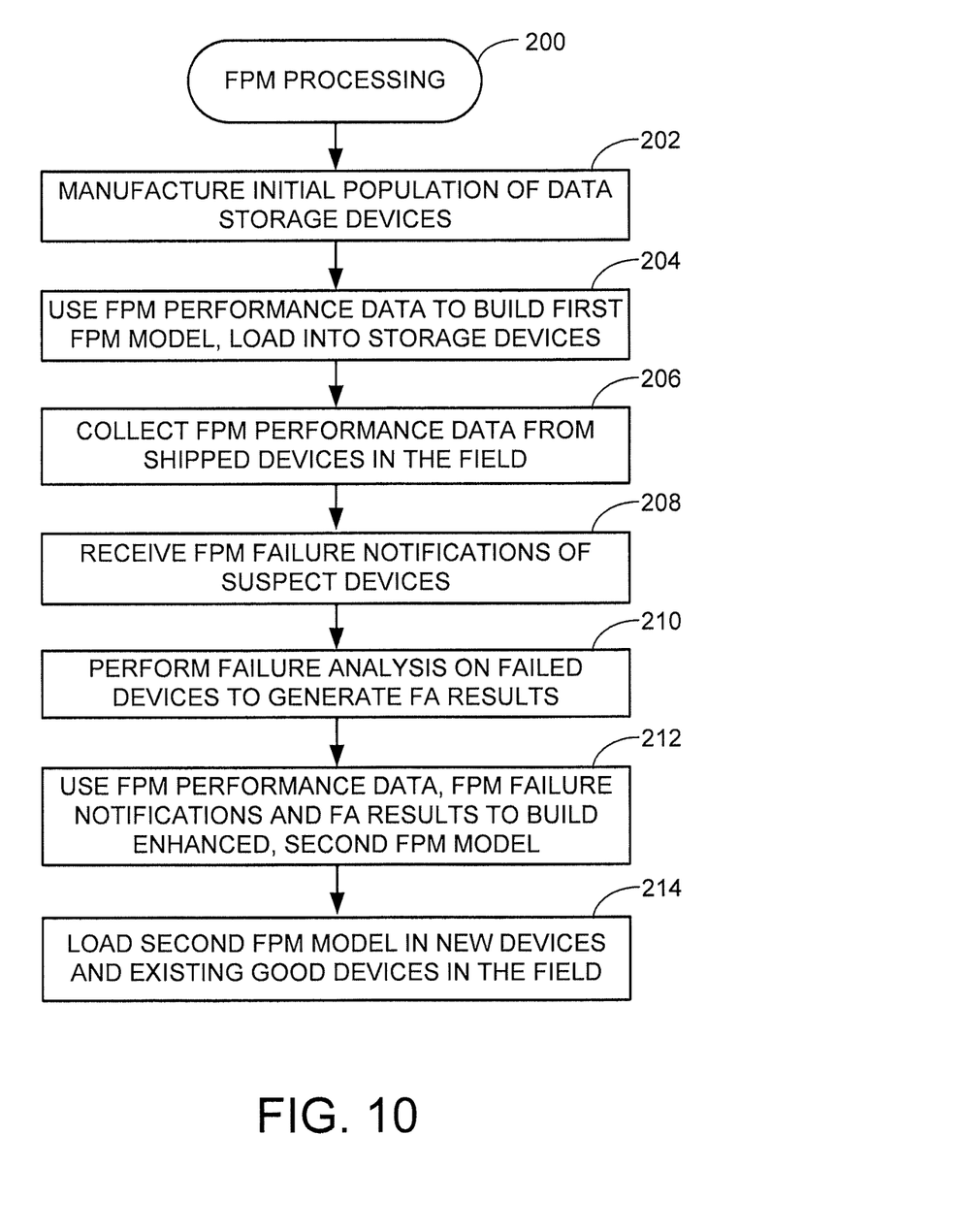
FIG. 10 is an FPM processing routine illustrative of steps carried out in accordance with various embodiments.

FIG. 10 is a flow chart for a failure prediction model (FPM) processing routine 200 to summarize the foregoing discussion. The various steps in FIG. 10 are illustrative and may be modified, augmented, etc. depending on the requirements of a given application.

At step 202, an initial population of data storage devices is manufactured. This may be an initial run of a particular device model. As illustrated above in FIG. 5, various forms of FPM performance data will be collected during this manufacturing process. It is contemplated that initially, a wide variety of different types of data may be collected; over time, additional sets may be added or existing forms of data may be dropped, depending on the statistical significance of the various types of data, either alone or in combination with other parameters.

At step 204, the collected FPM performance data are used to build a first version of a failure prediction model (FPM) using a generator unit such as 160 in FIG. 6. The initial FPM is loaded to these or another set of data storage devices, which are thereafter shipped to an end user for field use. The devices operate in step 206 to carry out normal read and write operations to transfer user data in the associated end user environments. Periodically, the devices transfer FPM performance data that has been collected by the devices back to the generator unit. As required, from time to time, should the initial FPM indicate a potential failure condition, notifications may further be transferred, step 208, back to the generator unit as well.

Devices that exhibit failures, either due to an FPM failure indication, a SMART system failure indication, or an actual failure, are returned as warranty returns at step 210, and failure analysis (FA) is applied to the devices. This provides additional FA results that are also forwarded to the generator unit.

As shown by step 212, the field FPM performance data, FPM failure notifications, and the FA results are utilized by the generator unit to build an enhanced, second FPM, step 212. This second FPM model is thereafter loaded into newly manufactured storage devices as well as provided to the existing good devices in the field, as indicated by step 214. The foregoing processing continues with successive iterations of improvements to the FPM, which may occur on a regularly scheduled basis (e.g., once a quarter, etc.).

It will now be appreciated that the various embodiments presented herein can provide a number of benefits. Providing an adaptive failure prediction model that utilizes data and failure notifications from a large population of devices in real world end user environments provides an enhanced ability to formulate notifications that are statistically correlated to pending failure events.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
using a plurality of first monitored parameters generated during operation of a first data storage device as an input to a failure prediction circuit of the first data storage device to predict a potential imminent failure of the first data storage device using a first copy of a first failure prediction model (FPM) stored in a memory of the first data storage device, and transferring a first set of data associated with the predicted potential imminent failure across a computer network from the failure prediction circuit of the first data storage device to a host device;
using a plurality of second monitored parameters generated during operation of a second data storage device as an input to a failure prediction circuit of a second data storage device that uses a second copy of the first FPM stored in a memory of the second data storage device, and transferring a second set of data across the computer network from the failure prediction circuit of the second data storage device to the host device, the second set of data indicating a predicted failure of the second data storage device is not imminent;
grouping the first and second sets of data based on a common operational environment of the first and second data storage devices to form a combined set of data;
generating an updated, second FPM responsive to the combined set of data by detecting at least one statistically significant correlation between the combined set of data and a selected failure event using a classification model; and
transferring, via a data transmission across the computer network, a first copy of the second FPM to a third data storage device to replace a third copy of the first FPM therein as a firmware update, the third data storage device sharing the common operational environment of the first and second storage devices.

2. The method of claim 1, wherein the host device generates both the first FPM and the second FPM using a programmable processor and a processor memory which stores programming that generates the respective first and second FPMs responsive to a database of the data transferred from the first and second data storage devices.

3. The method of claim 1, further comprising returning a fourth data storage device to a manufacturer with a declared failure condition, performing a failure analysis operation upon the fourth data storage device to obtain failure analysis data that either confirms or fails to reproduce the declared failure condition, and providing the failure analysis data to the host device which further generates the second FPM responsive to the failure analysis data.

4. The method of claim 1, further comprising maintaining the first FPM in a failure prediction circuit of a fourth data storage device responsive to the fourth data storage device having a different operational environment than the common operational environment of the first, second and third data storage devices.

5. The method of claim 1, wherein the first, second and third data storage devices are characterized as hard disc drives (HDDs) each having a data read/write transducer adjacent a rotatable data recording medium.

6. The method of claim 5, wherein the first and second sets of data transferred from the respective first and second data storage devices comprise resistance measurements associated with the respective data read/write transducers of the first and second data storage devices.

7. The method of claim 5, wherein the first and second data storage devices each further comprise a read/write (R/W) channel circuit, and the first and second sets of data transferred from the respective first and second data storage devices comprise channel parameters associated with the respective R/W channel circuits of the first and second data storage devices.

8. The method of claim 5, wherein the first and second data storage devices each further comprise at least one environmental sensor, and the data transferred from the respective first and second data storage devices comprise sensor measurements obtained from the respective sensors of the first and second data storage devices.

9. The method of claim 8, wherein the sensors comprise at least a selected one of a temperature sensor, an accelerometer, a power line monitoring circuit, an acoustic sensor, or an event timer.

10. The method of claim 1, wherein each of the first and second data storage devices further comprise a SMART (Self-Monitoring, Analysis and Reporting Technology) system stored as instructions in the associated local memory and executed by an associated processor to monitor and log various parameters associated with the ongoing operation of the respective first and second storage devices, wherein at least one parameter monitored by the FPM is not monitored by the SMART system, wherein the indication of the potential imminent failure associated with the first data storage device by the first FPM is provided to a local user of the first data storage device.

11. The method of claim 1, wherein the first and second FPMs each are characterized as a consolidated model that accumulates a plurality of parameters and outputs a potential imminent failure notification based on a combination of each of the plurality of parameters.

12. The method of claim 1, wherein the first and second FPMs each are characterized as a bifurcated model comprising a plurality of separate failure evaluation modules each receiving a different combination of a total plurality of input parameters from the associated first or second data storage device and a gate logic circuit that outputs an imminent failure notification signal to the host device responsive to an output of each of the separate failure evaluation modules in each of the first and second FPMs.

13. A method comprising:
manufacturing a first plurality of nominally identical data storage devices and collecting failure prediction model (FPM) data from each of the first plurality of nominally identical data storage devices;
using the collected FPM data to generate a first FPM by way of an FPM generation processing circuit, the first FPM representing programmable instructions storable in a local memory of the associated data storage device and executable by a local processor of the associated data storage device to provide a notification of a potentially imminent failure event based on subsequently generated FPM data generated by the associated data storage device;

storing a separate copy of the first FPM generated by the FPM generation processing circuit in the local memory of each of the first plurality of nominally identical data storage devices;

shipping each of the first plurality of nominally identical data storage devices to an end user and operating said devices in an associated end user environment to store data from a local host device;

executing the associated copy of the first FPM by the local processor of each of the first plurality of nominally identical data storage devices to evaluate operation of the associated data storage device responsive to the subsequently generated FPM data;

transmitting the subsequently generated FPM performance data from each of the first plurality of nominally identical data storage devices to the FPM generation processing circuit by way of a network connection;

transmitting failure notification data from at least a selected one of the first plurality of nominally identical data storage devices to the FPM generation processing circuit by way of the network connection;

using the transmitted, subsequently generated FPM performance data from each of the first plurality of nominally identical data storage devices and the transmitted failure notification data from the at least a selected one of the first plurality of nominally identical data storage devices by the FPM generation processing circuit to generate an enhanced, second FPM by grouping the performance data and the failure notification data based on a common operational environment, detecting statistically significant correlations between obtained data and failure conditions within a group and modeling the correlations using a classification model; and loading an associated copy of the second FPM into the local memory of each of the first plurality of nominally identical data storage devices having the common operational environment.

14. The method of claim 13, wherein the host device generates both the first FPM and the second FPM using a programmable processor and a processor memory which stores programming that generates the respective first and second FPMs responsive to a database of the data transferred from the first and second data storage devices.

15. The method of claim 13, further comprising returning a third data storage device to a manufacturer with a declared failure condition, performing a failure analysis operation upon the third data storage device to obtain failure analysis data that either confirms or fails to reproduce the declared failure condition, and providing the failure analysis data to the host device which further generates the second FPM responsive to the failure analysis data.

16. The method of claim 13, further comprising using the failure prediction circuit of the first data storage device to provide a local notification to a local user of the first data storage device of the potential imminent failure.

17. The method of claim 13, wherein the first and second data storage devices are characterized as hard disc drives (HDDs) each having a data read/write transducer adjacent a rotatable data recording medium.

18. The method of claim 13, wherein each of the first and second data storage devices further comprise a SMART (Self-Monitoring, Analysis and Reporting Technology) system stored as instructions in the associated local memory and executed by an associated processor to monitor and log various parameters associated with the ongoing operation of the respective first and second storage devices, wherein at least one parameter monitored by the FPM is not monitored by the SMART system, wherein the indication of the potential imminent failure associated with the first data storage device by the first FPM is provided to a local user of the first data storage device.

19. The method of claim 13, wherein the first and second FPMs each are characterized as a consolidated model that accumulates a plurality of parameters and outputs a potential imminent failure notification based on a combination of each of the plurality of parameters.

20. The method of claim 13, wherein the first and second FPMs each are characterized as a bifurcated model comprising a plurality of separate failure evaluation modules each receiving a different combination of a total plurality of input parameters from the associated first or second data storage device and a gate logic circuit that outputs an imminent failure notification signal to the host device responsive to an output of each of the separate failure evaluation modules in each of the first and second FPMs.

* * * * *